April 17, 1962 W. A. ROWLETT 3,030,136
COMBINATION COUPLING AND SLEEVE BEARING
Filed Oct. 14, 1960 2 Sheets-Sheet 1
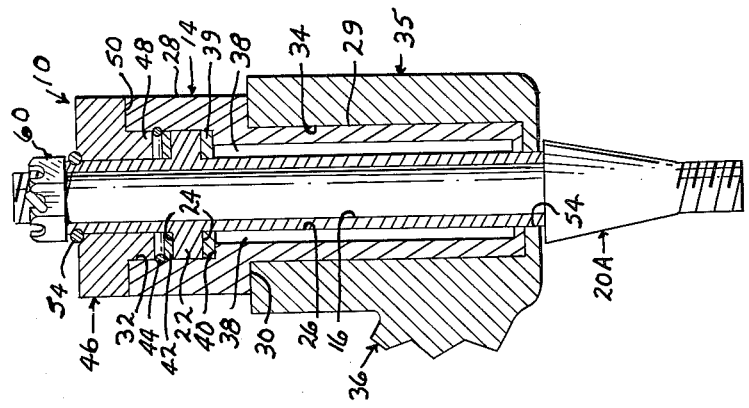
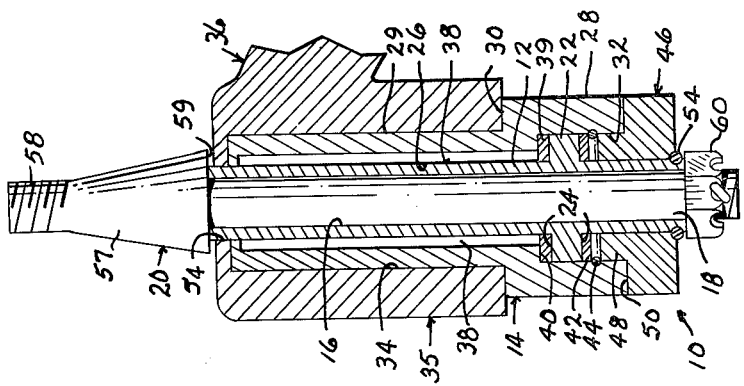
FIG. 2
FIG. 1
WILLARD A. ROWLETT
*INVENTOR.*
ATTORNEY April 17, 1962     W. A. ROWLETT     3,030,136
COMBINATION COUPLING AND SLEEVE BEARING
Filed Oct. 14, 1960     2 Sheets-Sheet 2
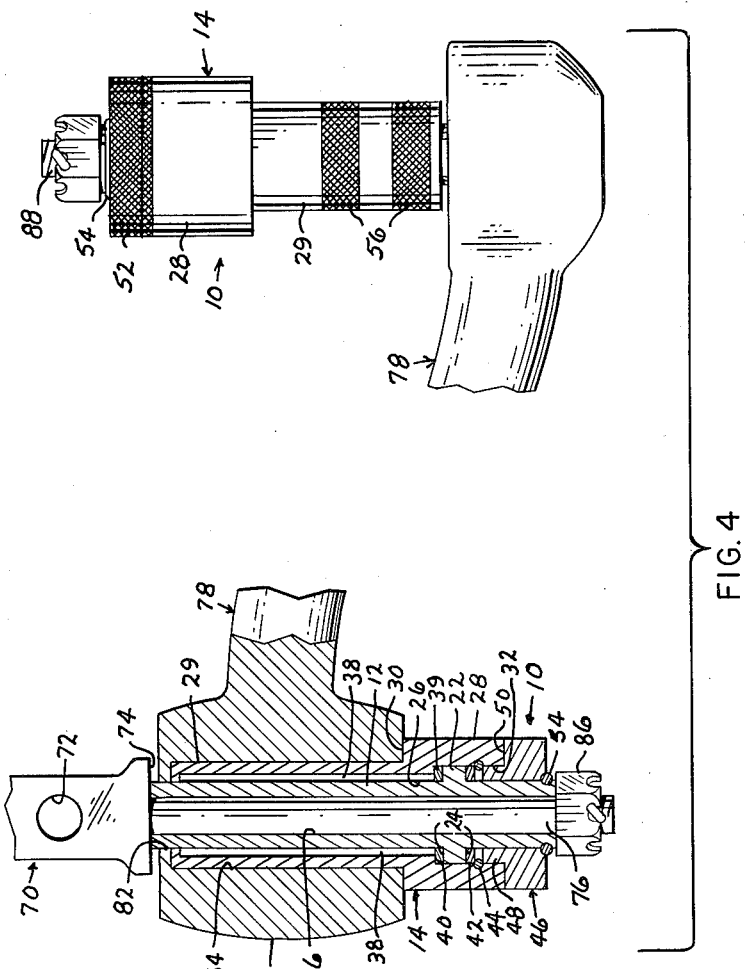
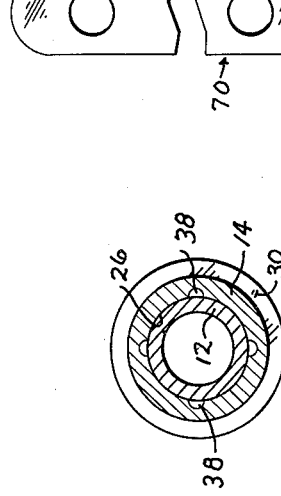
WILLARD A. ROWLETT
*INVENTOR.*
BY *Loyal J. Miller*
ATTORNEY

United States Patent Office 3,030,136
Patented Apr. 17, 1962

3,030,136
COMBINATION COUPLING AND SLEEVE
BEARING
Willard A. Rowlett, 409 Hatley Drive, Bethany, Okla.
Filed Oct. 14, 1960, Ser. No. 62,733
6 Claims. (Cl. 287—93)

The present invention relates to an automobile chassis and more particularly to a repair or replacement kit for new and worn idler arm bearings and brackets of automobiles.

It is conventional practice at present to equip the right-hand side of the steering mechanism with an idler arm to support that side of the steering means opposite the tie rod ends. The idler arm comprises a relatively short member which is pivotally connected at one end to the adjacent right-hand end portion of the tie rod and is pivotally connected at its opposite end to a bracket carried by the frame of the vehicle.

The principal objects of the idler arm are to add support and stability to the steering mechanism and ease in steering. Since the idler arm assembly is continually exposed to the weather, sand, grit, etc. enter the connections of most conventional idler arms and in as much as the idler arm bearings are subjected to continuous oscillating movement the conventional bearings wear rather rapidly. It is to the construction and arrangement of parts of the pivoting connections of the idler arm that the present invention relates.

The principal object of the instant invention is to provide a sleeve type bearing for interconnecting the ends of an idler arm with the tie rod and idler arm bracket which will eliminate idler arm wear, rattle, sagging and looseness of its connection.

A similar important object is to effect positive setting of wheel toe-in alignment and to maintain the same under road shock encountered by the wheels.

Another object is to provide idler arm bearings which will last out the life of the vehicle when properly lubricated at such times as the automotive chassis is lubricated.

An additional object is to provide idler arm bearings which effects substantially 30% easier steering, better control of the vehicle and prevents extensive tire wear by preventing constant caster and camber changes.

A further object is to provide a means for repairing a worn idler arm connection which permits metal to metal contact of the oscillating parts thereby eliminating the use of the conventional resilient bushings which tend to deteriorate with age.

The present invention accomplishes these and other objects by providing a sleeve type bearing adapted to be interposed between the idler arm and its supports.

Other objects will be apparent from the following description when taken in conjunction with the accompanying two sheets of drawings, wherein:

FIGURE 1 is an elevational view of the assembled bearing, per se.;
FIGURE 2 is a fragmentary cross-sectional view, partly in elevation, illustrating the use of the device in connecting one type of idler arm;
FIGURE 3 is a horizontal cross-sectional view taken substantially along the line 3—3 of FIG. 1; and,
FIGURE 4 is a fragmentary elevational view illustrating the device connecting another type of idler arm to its supports, one of the bearings and a fragment of the adjacent end portion of the idler arm being shown in cross section.

Like characters of reference designate like parts in those figures of the drawings in which they occur.

In the drawings:
Referring more particularly to FIG. 2 the reference numeral 10 indicates the device, as a whole, comprising an elongated inner sleeve 12 and an outer sleeve 14. The inner sleeve 12 is centrally bored as at 16 to closely receive the shaft 18 of an idler arm bracket connector 20 or the like. Adjacent one of its end portions the sleeve 12 is provided with an annular outstanding flange 22 having opposing parallel edges 24 perpendicular to the longitudinal axis of the sleeve.

The outer sleeve 14 is substantially shorter than the overall length of the inner sleeve 12 and is centrally bored as at 26 to be closely received by the periphery of the inner sleeve 12. One end of the outer sleeve is provided with a circumferentially enlarged end portion 28 forming an abrupt shoulder 30 perpendicular to its longitudinal axis. The enlarged end portion 28 is counterbored as at 32 for freely receiving the annular flange 22. As shown in the drawings the depth of the counterbore 32 is substantially greater than the thickness of the flange 22 for the purposes which will presently be apparent.

The periphery of the reduced end portion 29 of the outer sleeve is adapted to be closely received by the wall 34 forming a bore in a boss 35 formed on the end portion of a conventional idler arm 36 as more fully explained hereinbelow. The wall of the outer sleeve forming the bore 26 is broached or grooved to provide a plurality of oil receiving grooves 38, preferably spaced apart 90° (FIG. 3). These oil grooves extend longitudinally of the reduced end portion of the outer sleeve and terminate adjacent but spaced from the end of the outer sleeve opposite its counterbore. A carburized washer 39 is interposed between the flange surface 24 and inward of the end 40 of the counterbore. A second washer 42 is placed adjacent the opposite surface of the flange 22 within the counterbore 32. A snap ring 44, co-operatingly received by a suitable groove formed in the wall forming the counterbore, maintains the inner sleeve and washers assembled within the outer sleeve 14.

An adapter 46, diametrically equal with respect to the enlarged end portion 28 of the outer sleeve, is provided with a reduced end portion 48 forming an annular shoulder 50. The reduced end portion 48 is closely received by the counterbore 32 and the shoulder 50 contacts the adjacent end of the outer sleeve to complete the bearing. The periphery of the enlarged portion 28 and adapter 46 are spun or knurled, as at 52 (FIGS. 1 and 4), to form a sealed unit. The adjacent end of the inner sleeve 12 preferably projects slightly beyond the free end of the adapter 46 and a lock ring 54 is seated in a suitable groove formed in the periphery of the inner sleeve, adjacent the adapter, to prevent displacement of the latter when pressure is applied as by a grease gun when the bearing is greased.

Operation

In operation the bearing 10 is assembled as described hereinabove. The bore 34 of the idler arm boss 35 is drilled from one end to closely receive the periphery of the reduced end portion 29 of the outer sleeve leaving a reduced bore 54 at one end of the boss adapted to closely receive the periphery of the end of the inner sleeve 12 projecting beyond the reduced end portion 29. The depth of the idler arm bore 34 is such that when the outer sleeve is pressed into the bore, the adjacent end of the inner sleeve will project beyond the idler arm a slight distance, approximately 1/32 of an inch. The periphery of the reduced end portion 29 of the outer sleeve is knurled in two places, as at 56, to prevent rotation of the outer sleeve with respect to the idler arm boss.

The idler arm bracket 20 includes a tapered end portion 57 adapted to be received and secured by threads 58 and a nut, not shown, to a suitable bracket, not shown, connected to the vehicle. The tapered end forms an annular shoulder 59 for the purposes which will presently be apparent. The assembled idler arm and bearing 10 are connected to the idler arm bracket shaft 18 by sliding the inner sleeve over the free end of the shaft. A nut 60, threadedly connected to the free end of the shaft projecting beyond the bearing 10, impinges the opposing ends of the inner sleeve between the nut and shoulder 59. As shown in the drawings this leaves a slight spacing between the idler arm boss 35 and the shoulder 59 so that this end of the idler arm and outer sleeve 14 may move longitudinally of the inner sleeve a distance equal to the spacing between the idler arm boss and the shoulder 59 to absorb road shock transmitted to the idler arm. The opposing end of the idler arm 36 is connected to the tie rod by one of the bearings 10 and a similarly formed connector member 20A which is, in turn, connected to the tie rod, not shown, in a conventional manner.

Referring more particularly to FIG. 4, the numeral 70 indicates another conventional idler arm bracket secured to the vehicle frame by bolts, not shown, through apertures 72 in a conventional manner. The bracket 70 is similarly provided with an annular shoulder 74 and an elongated reduced diameter shaft portion 76. A conventional idler arm 78, having an enlarged boss 80 at one end, is drilled and counterbored, as at 82 and 84, respectively, for receiving the inner sleeve 12 and outer sleeve 14 of the bearing 10 as described hereinabove. Similarly, a nut 86, secured to the shaft 76, impinges the opposing ends of the inner sleeve 12 between the nut and the shoulder 74. The opposing end of this idler arm is provided with a shaft 88 similar to the shaft 76 for receiving one of the assembled bearings 10 for connecting the reduced end portion 29 of the outer sleeve to a suitable bore formed in the adjacent end of the tie rod, not shown.

Thus it may be seen that the inner sleeve 12 is prevented from rotating with respect to the idler arm bracket shaft and that rotative movement of the respective end of the idler arm rotates the outer sleeve 14 about the inner sleeve 12. The carburized washer 39 provides an additional bearing surface between the outer and inner sleeves endwise of the bearing.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An idler arm coupling and bearing for interconnecting an idler arm and idler arm bracket for pivoting movement of the idler arm relative to the idler arm bracket, one end of said idler arm having an enlarged centrally bored boss, said idler arm bracket having an elongated shaft portion of reduced diameter, including: an outer sleeve having an end portion closely received by the bore in said boss, said outer sleeve having a circumferentially enlarged counterbored end disposed against one end of said boss; an inner sleeve having a periphery closely received by the bore in said outer sleeve, said inner sleeve having an annular flange freely received within the counterbore in said outer sleeve, said inner sleeve projecting beyond the respective ends of said outer sleeve; a first washer interposed between said flange and the inner end of the counterbore in said outer sleeve; a second washer around said inner sleeve adjacent said annular flange; an adapter received by the counterbore of said outer sleeve around said inner sleeve; and means holding said bearing on the idler arm shaft.

2. An idler arm coupling and bearing for interconnecting an idler arm and idler arm bracket for pivoting movement of the idler arm relative to the idler arm bracket, one end of said idler arm having an enlarged centrally bored and counterbored boss, said idler arm bracket having an elongated shaft portion of reduced diameter, including: an outer sleeve having a reduced end portion closely received by the counterbore in said boss, said outer sleeve having a counterbore in its end opposite the reduced end; an inner sleeve having a periphery closely received by said outer sleeve, said inner sleeve having an annular flange freely received within the counterbore in said outer sleeve, said inner sleeve projecting beyond the respective ends of said outer sleeve and said idler arm boss; a first washer interposed between said flange and the inner end of the counterbore in said outer sleeve; a second washer around said inner sleeve adjacent said annular flange; a first lock ring secured to the wall forming the counterbore of said outer sleeve adjacent said annular flange adjacent said second washer for holding the inner sleeve in place; an adapter received by the counterbore of said outer sleeve around said inner sleeve; a second lock ring surrounding the end of said inner sleeve adjacent the free end of said adapter; and means holding said bearing on the idler arm shaft.

3. An idler arm coupling and bearing for interconnecting an idler arm and idler arm bracket for pivoting movement of the idler arm relative to the idler arm bracket, one end of said idler arm having an enlarged centrally bored boss, said idler arm bracket having an elongated shaft portion of reduced diameter, including: an outer sleeve having one end portion closely received by the bore in said boss, said outer sleeve having a circumferentially enlarged end forming an abrupt shoulder disposed against the adjacent end of said boss, said outer sleeve having a counterbore in its enlarged end; an elongated inner sleeve having a periphery closely received by the small bore in said outer sleeve, said inner sleeve having an annular flange freely received within the counterbore in said outer sleeve, said inner sleeve projecting beyond the respective ends of said outer sleeve and said boss; a washer interposed between said flange and the inner end of the counterbore in said outer sleeve; means within the counterbore of said outer sleeve in contact with said inner sleeve for holding the latter in place; an adapter closing the counterbored end of said outer sleeve around said inner sleeve; means securing said adapter to said outer sleeve; and a nut for holding said bearing on the idler arm bracket.

4. An idler arm coupling and bearing for interconnecting an idler arm and idler arm bracket for pivoting movement of the idler arm relative to the idler arm bracket, one end of said idler arm having an enlarged centrally bored boss, said idler arm bracket having an elongated shaft portion of reduced diameter, including: an outer sleeve having one end portion closely received by the bore in said boss, said outer sleeve having a circumferentially enlarged end forming an abrupt shoulder disposed against the adjacent end of said boss, said outer sleeve having a counterbore in its enlarged end; an elongated inner sleeve having a periphery closely received by the small bore in said outer sleeve and forming a bearing surface, said inner sleeve having an annular flange freely received within the counterbore in said outer sleeve, said inner sleeve projecting beyond the respective ends of said outer sleeve and said boss; bearing means interposed between said flange and the inner end of the counterbore in said outer sleeve; means within the counterbore of said outer sleeve in contact with said inner sleeve for holding the latter in place; an adapter closing the counterbored end of said outer sleeve around said inner sleeve; means securing said adapter to said outer sleeve; and a nut for holding said bearing on the idler arm bracket.

5. A bearing for joining a first member and a second member for relative pivoting movement, comprising: an elongated inner sleeve having a flange intermediate its ends; an outer elongated sleeve having a bore closely receiving one end portion of said inner sleeve and forming a bearing surface, said outer sleeve having a circumferentially enlarged end portion surrounding the flange on said inner sleeve, said outer sleeve having a counterbore in its enlarged end portion for freely receiving said flange; bearing means interposed between said flange and the inward end of the counterbore; means locking said inner sleeve within the outer sleeve; and an adapter secured to the enlarged end of said outer sleeve around the inner sleeve.

6. A bearing for joining a first member and a second member for relative oscillating movement, comprising: an elongated inner sleeve adapted to receive and be secured to said first member, said inner sleeve having a flange intermediate its ends; an outer elongated sleeve adapted to be secured to said second member, said outer sleeve having a bore closely receiving one end portion of said inner sleeve and forming a bearing surface, said inner sleeve projecting beyond the ends of said outer sleeve, said outer sleeve having a circumferentially enlarged end portion surrounding the flange on said inner sleeve, said outer sleeve having a counterbore in its enlarged end portion for freely receiving said flange; bearing means interposed between said flange and the inward end of the counterbore; means locking said inner sleeve within the outer sleeve; and an adapter secured to the enlarged end of said outer sleeve around the inner sleeve.

References Cited in the file of this patent

UNITED STATES PATENTS

| | | |
|---|---|---|
| 2,805,878 | Traugott | Sept. 10, 1957 |
| 2,809,049 | Carlson | Oct. 8, 1957 |
| 2,846,251 | Herbenar | Aug. 5, 1958 |